(12) United States Patent
Park

(10) Patent No.: US 8,549,328 B2
(45) Date of Patent: Oct. 1, 2013

(54) MEMORY CONTROLLER, MEMORY SYSTEM INCLUDING THE SAME, AND METHOD FOR OPERATING THE SAME

(75) Inventor: Kitae Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 276 days.

(21) Appl. No.: 12/777,676

(22) Filed: May 11, 2010

(65) Prior Publication Data

US 2010/0293393 A1 Nov. 18, 2010

(30) Foreign Application Priority Data

May 18, 2009 (KR) .................. 10-2009-0043149

(51) Int. Cl.
*G06F 21/00* (2006.01)
(52) U.S. Cl.
USPC .......................................... 713/193; 713/189
(58) Field of Classification Search
USPC .................................................. 713/193, 189
See application file for complete search history.

(56) References Cited

U.S. PATENT DOCUMENTS

| 7,215,575 | B2 | 5/2007 | Chen et al. | |
|---|---|---|---|---|
| 7,848,143 | B2 * | 12/2010 | Kanno et al. | 365/185.03 |
| 8,060,669 | B2 * | 11/2011 | Yu | 710/52 |
| 8,127,200 | B2 * | 2/2012 | Sharon et al. | 714/763 |
| 2008/0205145 | A1 * | 8/2008 | Kanno et al. | 365/185.05 |
| 2008/0263369 | A1 * | 10/2008 | Min et al. | 713/193 |
| 2009/0063758 | A1 * | 3/2009 | Chang et al. | 711/103 |
| 2009/0067244 | A1 * | 3/2009 | Li et al. | 365/185.12 |
| 2009/0083485 | A1 * | 3/2009 | Cheng | 711/114 |
| 2011/0156934 | A1 * | 6/2011 | Bae et al. | 341/58 |
| 2011/0157992 | A1 * | 6/2011 | Strasser et al. | 365/185.18 |
| 2012/0297271 | A1 * | 11/2012 | Sommer et al. | 714/766 |

FOREIGN PATENT DOCUMENTS

| KR | 1020080065832 | 7/2008 |
|---|---|---|
| KR | 1020080090772 | 10/2008 |

* cited by examiner

*Primary Examiner* — Jeffrey Pwu
*Assistant Examiner* — William Corum, Jr.
(74) *Attorney, Agent, or Firm* — Myers Bigel Sibley & Sajovec, P.A.

(57) ABSTRACT

A memory controller includes a first interface unit, a processor, a randomization unit, a state conversion unit, and a second interface unit. The first interface unit exchanges data with an external device, and the processor determines whether to randomize or state-convert the received data. The randomization unit randomizes data received through the first interface unit in response to the processor and generates randomization information in response to the randomization operation. The state conversion unit state-converts data received through the first interface unit in response to the processor and generates conversion information in response to the state conversion operation. The second interface unit receives the randomized data and the randomization information from the randomization unit, receives the state-converted data and the conversion information from the state conversion unit, and exchanges at least one of the randomized data, the randomization information, the state-converted data and the conversion information with a memory.

15 Claims, 12 Drawing Sheets

MEMORY CONTROLLER, MEMORY SYSTEM INCLUDING THE SAME, AND METHOD FOR OPERATING THE SAME

CROSS-REFERENCE TO RELATED APPLICATIONS

This U.S. non-provisional patent application claims priority under 35 U.S.C. §119 to Korean Patent Application No. 10-2009-0043149, filed on May 18, 2009, the disclosure of which is hereby incorporated by reference.

BACKGROUND

The present disclosure herein relates to semiconductor memory devices, and more particularly, to nonvolatile memory devices.

Semiconductor memory devices are memory devices that are implemented using a semiconductor, such as silicon. The semiconductor memory devices are classified into volatile memory devices and nonvolatile memory devices.

Volatile memory devices lose data stored therein when power supply thereto is interrupted. Examples of volatile memory devices include static random access memory (SRAM) devices, dynamic random access memory (DRAM) devices, and synchronous dynamic random access memory (SDRAM) devices. Nonvolatile memory devices retain data stored therein even when power supply thereto is interrupted. Examples of nonvolatile memory devices include read-only memory (ROM) devices, programmable read-only memory (PROM) devices, erasable programmable read-only memory (EPROM) devices, electrically erasable programmable read-only memory (EEPROM) devices, flash memory devices, phase-change random access memory (PRAM) devices, magnetic random access memory (MRAM) devices, resistive random access memory (RRAM) devices, and ferroelectric random access memory (FRAM) devices. The flash memory devices are classified into NOR-type flash memory devices and NAND-type flash memory devices.

SUMMARY

A memory controller according to some embodiments includes a first interface unit configured to exchange data with an external device; a processor configured to determine, in response to data received through the first interface unit, whether to randomize or state-convert the received data; a randomization unit configured to randomize first data received through the first interface unit in response to the control of the processor and to generate randomization information in response to the randomization operation; a state conversion unit configured to state-convert second data received through the first interface unit in response to the control of the processor and to generate conversion information in response to the state conversion operation; and a second interface unit configured to receive the randomized first data and the randomization information from the randomization unit, receive the state-converted second data and the conversion information from the state conversion unit, and exchange at least one of the randomized data, the randomization information, the state-converted data and the conversion information with a memory.

In some embodiments, the randomization unit is configured to restore the randomized first data to the original first data using the randomization information received through the second interface unit in response to receiving the randomized first data and the randomization information through the second interface unit.

In other embodiments, the state conversion unit is configured to restore the state-converted second data to the original data using the conversion information received through the second interface unit in response to receiving the state-converted second data and the conversion information through the second interface unit.

In further embodiments, the randomization unit is configured to generate a random sequence in response to a predetermined seed, to perform a logical operation on the random sequence and the received first data, to output the results of the logical operation as the randomized first data, and to output the predetermined seed as the randomization information.

In still further embodiments, the state conversion unit is configured to counts the number of the respective logic states of the received second data, to compare the number of the first logic states of the received second data and the number of the second logic states of the received second data, and to exchange the first logic states and the second logic states in response to the comparison results.

In still further embodiments, the state conversion unit converts the received second data such that the number of the highest logic states among the received second data becomes smaller than the number of the other respective logic states.

In still further embodiments, the state conversion unit converts the received second data such that the number of the lowest logic states among the received second data becomes smaller than the number of the other respective logic states.

In still further embodiments, in response to receiving second data with first and second logic states through the first interface unit, the state conversion unit is configured to count the number of the first logic states and the second logic states of the received second data and to invert the received second data in response to the number of the first logic states being smaller than the number of the second logic states.

In still further embodiments, the processor determines to randomize the received data when the received data correspond to sequential data.

In still further embodiments, the processor determines to state-convert the received data when the received data correspond to random data.

A memory system according to some embodiments includes a nonvolatile memory device and a memory controller configured to control the nonvolatile memory device. The memory controller includes a first interface unit configured to exchange data with an external device; a processor configured to determine, in response to data received through the first interface unit, whether to randomize or state-convert the received data; a randomization unit configured to randomize first data received through the first interface unit in response to the control of the processor and to generate randomization information in response to the randomization operation; a state conversion unit configured to state-convert second data received through the first interface unit in response to the control of the processor and to generate conversion information in response to the state conversion operation; and a second interface unit configured to receive the randomized first data and the randomization information from the randomization unit, receive the state-converted second data and the conversion information from the state conversion unit, and exchange data with the nonvolatile memory device.

In some embodiments, the nonvolatile memory device and the controller forms a solid state drive (SSD).

In other embodiments, the nonvolatile memory device and the controller forms a memory card.

Methods for operating a memory controller according to some embodiments include receiving data from an external device; determining whether to perform a randomization operation or a state conversion operation on the basis of the received data; and randomizing or state-converting the received data in response to the determination results.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
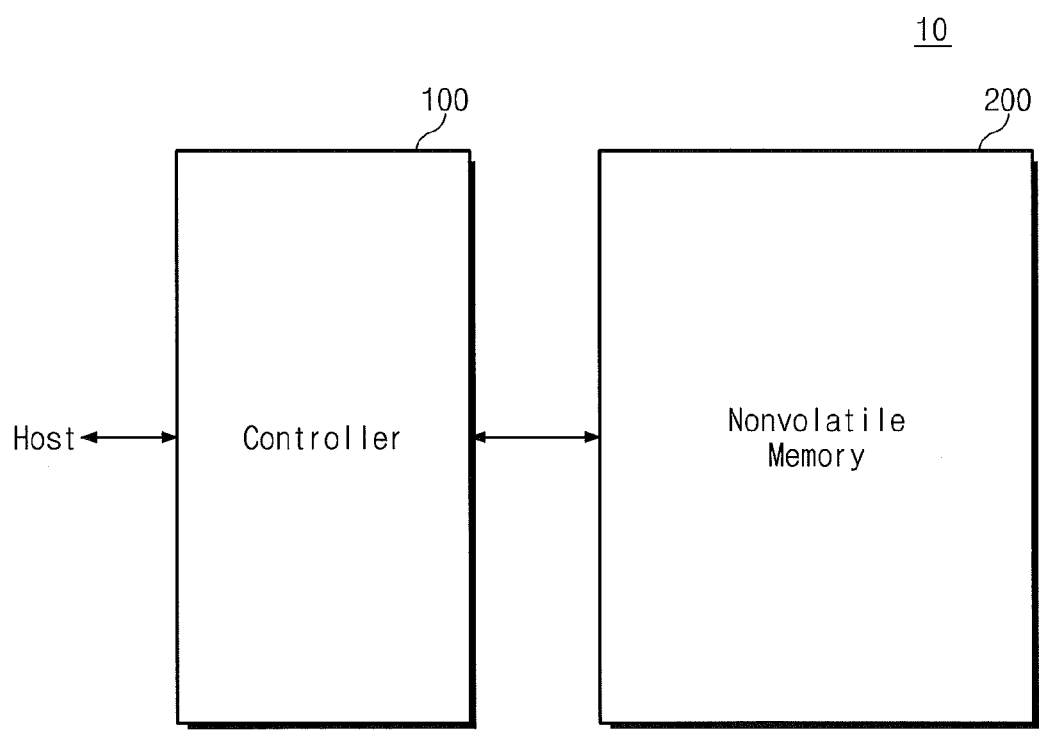
FIG. 1 is a block diagram of a memory system according to some embodiments.

FIG. 1 is a block diagram of a memory system according to some embodiments.

Referring to FIG. 1, a memory system 10 according to some embodiments includes a controller 100 and a nonvolatile memory device 200.

The controller 100 is connected to a host and the nonvolatile memory device 200. The controller 100 is configured to transfer data that is read from the nonvolatile memory device 200 to the host and store data that is received from the host in the nonvolatile memory device 200. The controller 100 will be described later in detail with reference to FIG. 3.

The nonvolatile memory device 200 may include a memory cell array for storing data, a read/write circuit for reading/writing data from/in the memory cell array, an address decoder for decoding an address received from an external device and transferring the same to the read/write circuit, and a control logic circuit for controlling an overall operation of the nonvolatile memory device 200. The nonvolatile memory device 200 will be described later in detail with reference to FIGS. 2 and 17.

The controller 100 and the nonvolatile memory device 200 may be integrated into one semiconductor device. As an example, the controller 100 and the nonvolatile memory device 200 may be integrated into one semiconductor device to constitute a memory card. For example, the controller 100 and the nonvolatile memory device 200 may be integrated into one semiconductor device to constitute a PC card (e.g., PCMCIA (Personal Computer Memory Card International Association)), a compact flash card (CF), a smart media card (SM/SMC), a memory stick, a multimedia card (e.g., MMC, RS-MMC and MMCmicro), a SD card (e.g., SD, miniSD, and microSD), or a universal flash storage (UFS).

As another example, the controller 100 and the nonvolatile memory device 200 may be integrated into one semiconductor device to constitute a solid state drive (SSD). For example, the SSD may include a device that is configured to store data in a semiconductor memory. When the memory system 10 is used as an SSD, the operation speed of the host connected to the memory system 10 may increase remarkably.

As another example, the memory system 10 may be applicable to computers, UMPCs (Ultra Mobile PCs), workstations, net-books, PDAs (Personal Digital Assistants), portable computers, web tablets, wireless phones, mobile phones, smart phones, digital cameras, digital audio recorders, digital audio players, digital picture recorders, digital picture players, digital video recorders, digital video players, devices capable of transmitting/receiving information in wireless environments, one of various electronic devices constituting a home network, one of various electronic devices constituting a computer network, one of various electronic devices constituting a telematics network, or one of various components (e.g., an SSD and a memory card) constituting a computing system.

As another example, the nonvolatile memory device 200 or the memory system 10 may be mounted in various types of packages. Examples of the packages of the nonvolatile memory device 200 or the memory system 10 include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level processed Stack Package (WSP).

Figure 2:
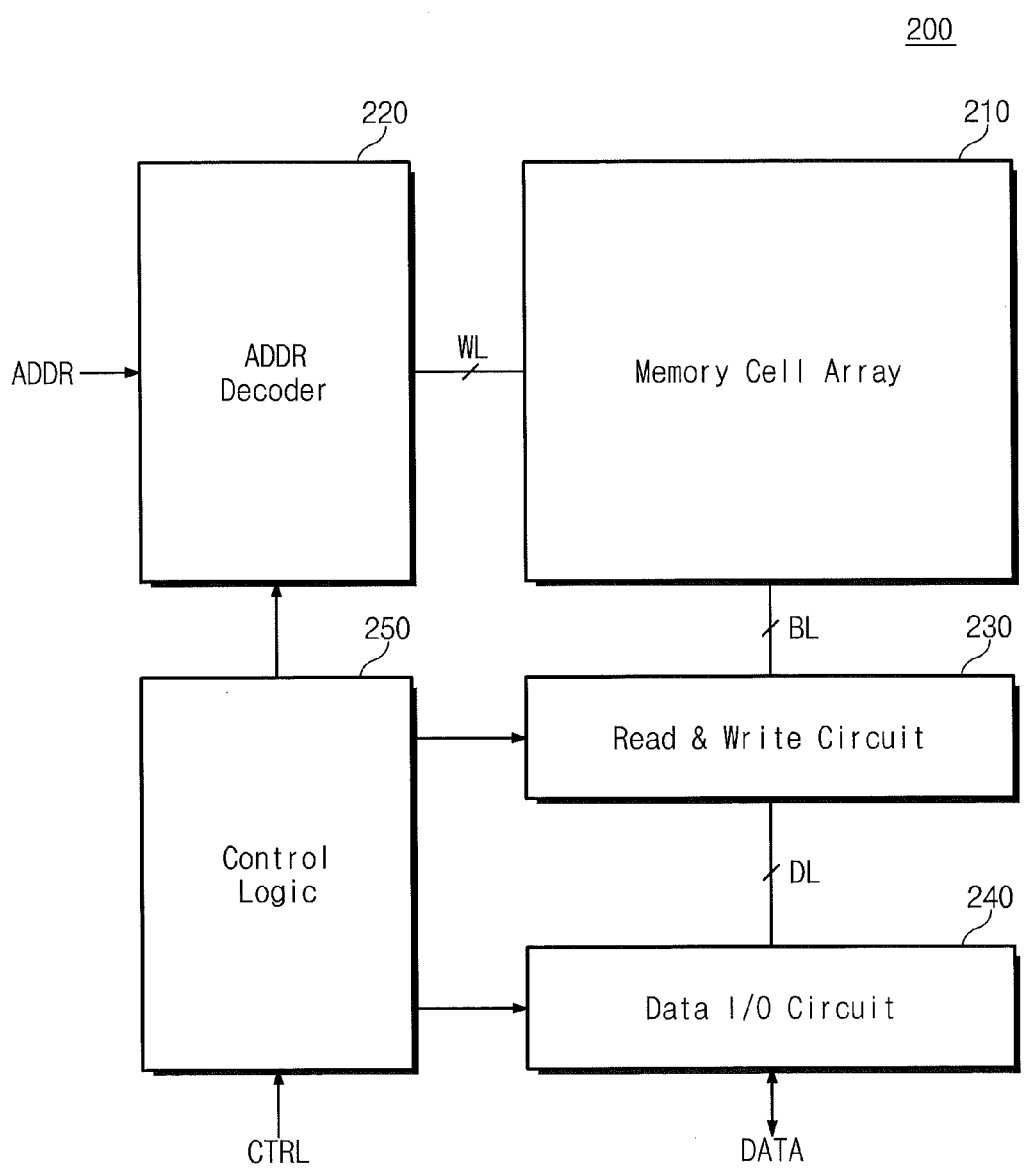
FIG. 2 is a block diagram of a nonvolatile memory device of FIG. 1 according to some embodiments.

FIG. 2 is a block diagram of the nonvolatile memory device 200 of FIG. 1 according to some embodiments.

Referring to FIG. 2, the nonvolatile memory device 200 includes a memory cell array 210, an address decoder 220, a read/write circuit 230, a data input/output (I/O) circuit 240, and a control logic circuit 250.

The memory cell array 210 is connected through word lines WL to the address decoder 220 and is connected through bit lines BL to the read/write circuit 230. The memory cell array 210 includes a plurality of memory cells. For example, rows of the memory cells are connected to the word lines WL, and columns of the memory cells are connected to the bit lines BL. For example, the memory cells are configured to store one or more bits per cell.

The address decoder 220 is connected through the word lines WL to the memory cell array 210. The address decoder 220 operates in response to the control of the control logic circuit 250. The address decoder 220 receives an address ADDR from an external device. For example, the address ADDR is received from the controller 100 of FIG. 1.

The address decoder 220 decodes a row address among the received addresses ADDR and selects the word lines WL according to the decoded row address. The address decoder 220 decodes a column address among the received addresses ADDR and transfers the decoded column address to the read/write circuit 230. For example, the address decoder 220 includes a row decoder, a column decoder, and an address buffer.

The read/write circuit 230 is connected through the bit lines BL to the memory cell array 210 and is connected through data lines DL to the data I/O circuit 240. The read/write circuit 230 operates in response to the control of the control logic circuit 250. The read/write circuit 230 receives the decoded column address from the address decoder 220 and selects the bit lines BL according to the decoded column address.

For example, the read/write circuit 230 receives data from the controller 100 and stores the received data in the memory cell array 210. As another example, the read/write circuit 230 reads data from the memory cell array 210 and transfers the read data to the data I/O circuit 240. As another example, the read/write circuit 230 reads data from a first storage region of the memory cell array 110 and writes the read data in a second storage region of the memory cell array 210. For example, the read/write circuit 230 performs a copy-back operation.

For example, the read/write circuit 230 includes a page buffer and a column selection circuit. As another example, the read/write circuit 230 includes a sense amplifier, a write driver, and a column selection circuit.

The data I/O circuit 240 is connected through the data lines DL to the read/write circuit 230. The data I/O circuit 240 operates in response to the control of the control logic circuit 250. The data I/O circuit 240 exchanges data with an external device. For example, the data I/O circuit 240 exchanges data with the controller 100 of FIG. 1. Data received from an external device are transferred through the data lines DL to the read/write circuit 230. Data received from the read/write circuit 230 are outputted to an external device. For example, the data I/O circuit 240 includes a data buffer.

The control logic circuit 250 is connected to the address decoder 220, the read/write circuit 230, and the data I/O circuit 240. The control logic circuit 250 controls an overall operation of the nonvolatile memory device 200. The control logic circuit 250 operates in response to a control signal CTRL received from an external device. For example, the control signal CTRL is received from the controller 100 of FIG. 1.

Hereinafter, it is assumed that the nonvolatile memory device 200 is a flash memory device. However, it will be understood that the nonvolatile memory device 200 is not limited to being a flash memory device. For example, it will be understood that the nonvolatile memory device 200 may be configured using nonvolatile memories such as EPROMs, EEPROMs, flash memories, PRAMs, MRAMs, FRAMs, and RRAMs.

Hereinafter, it is assumed that the flash memory device 200 is configured to store two bits in a memory cell. For example, the flash memory device 200 may include multi-level cells that are configured to store a least significant bit (LSB) and a most significant bit (MSB) in a memory cell. A memory cell may be programmed to one of four logic states. The logic states programmed in a memory cell may be discerned by the threshold voltage of the memory cell.

The memory cells connected to a word line may form two logic pages. For example, the LSBs of memory cells connected to a word line may form a least significant page. The MSBs of memory cells connected to a word line may form a most significant page.

However, it will be understood that the flash memory device 200 is not limited to storing two bits in a memory cell. For example, it will be understood that the flash memory device 200 may be configured to store one bit in a memory cell. As another example, it will be understood that the flash memory device 200 may be configured to store an LSB, an MSB and at least one central significant bit (CSB) in a memory cell.

For example, it is assumed that the flash memory device 200 supports a random write operation and a random read operation. The random write operation may be an operation of writing, in the flash memory device 200, data smaller than the page of the flash memory device 200. The random read operation may be an operation of reading, from the flash memory device 200, data smaller than the page of the flash memory device 200.

It is illustrated in FIG. 2 that the flash memory device 200 includes one memory cell array 210 and one read/write circuit 230. However, it will be understood that the flash memory device 200 may include a plurality of memory cell arrays and a plurality of read/write circuits. For example, the flash memory device 200 may include a plurality of planes that can be read and written independently.

Figure 3:
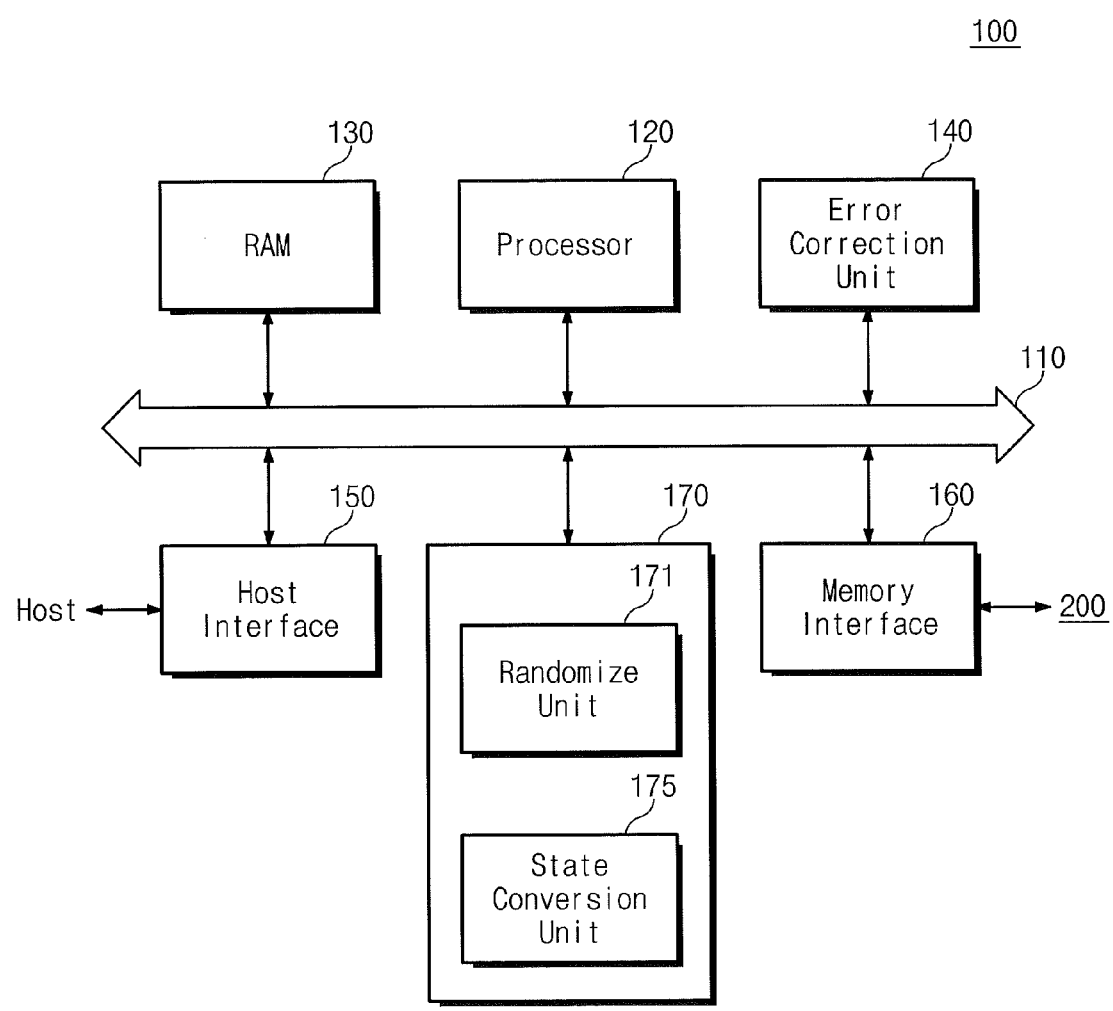
FIG. 3 is a block diagram of a controller of FIG. 1 according to some embodiments.

FIG. 3 is a block diagram of the controller 100 of FIG. 1 according to some embodiments.

Referring to FIG. 3, the controller 100 includes a system bus 110, a processor 120, a RAM 130, an error correction unit 140, a host interface 150, a memory interface 160, and an encoding/decoding unit 170.

The system bus 110 provides a channel between the components of the controller 100. The processor 120 accesses the components of the controller 100 through the system bus 110. The processor 120 may control the components of the controller 100. The processor 120 may control an overall operation of the controller 100.

The RAM 130 is connected to the system bus 110. For example, the RAM 130 may be used as a working memory of the controller 100. For example, the software driven by the processor 120 may be loaded into the RAM 130. For example, the components of the controller 100 may perform a predetermined operation by means of the RAM 130. For example, the RAM 130 may be used as a buffer memory. For example, data transferred through the controller 100 to the flash memory device 200 may be temporarily stored in the RAM 130. Data transferred from the flash memory device 200 through the controller 100 to the host may be temporarily stored in the RAM 130.

The error correction unit 140 is connected to the system bus 110. The error correction unit 140 may be configured to correct an error in data read from the flash memory device 200. For example, the error correction unit 140 may generate error check data for user data to be written in the flash memory device 200. The user data and the error check data may be stored in the flash memory device 200. When the user data and the error check data are read from the flash memory device 200, the error correction unit 140 may detect and correct an error in the read user data by means of the read error check data.

For example, the error check data may include CRC (Cyclic Redundancy Check) data, BCH (Bose, Chaudhuri, and Hocquenghem) data, and RS (Reed-Solomon) data. For example, the error correction unit 140 may be implemented in hardware as a digital circuit, an analog circuit, or a combination thereof. As another example, the error correction unit 140 may be implemented in software. As another example, the error correction unit 140 may be implemented in a combination of hardware and software.

The host interface 150 interfaces with the host. The host interface 150 may include a protocol for communication with the host. For example, the host interface 150 may include one of various interface protocols such as USB (Universal Serial Bus), MMC (Multimedia Card), PCI (Peripheral Component Interface), PCI-E (PCI-Express), ATA (Advanced Technology Attachment), Serial-ATA, Parallel-ATA, SCSI (Small Computer Small Interface), ESDI (Enhanced Small Disk Interface), and IDE (Integrated Drive Electronics).

The memory interface 160 interfaces with the flash memory device 200. The memory interface 160 may include a protocol for communication with the flash memory device 200. For example, the memory interface 160 may include a NAND protocol.

The encoding/decoding unit 170 is connected to the system bus 110. The encoding/decoding unit 170 is configured to encode data received through the host interface 150 from the host. The encoded data are transferred through the memory interface 160 to the flash memory device 200. The encoding/decoding unit 170 is configured to decode data received through the memory interface 160 from the flash memory device 200. The decoded data are outputted through the host interface 150.

The encoding/decoding unit 170 includes a randomization unit 171 and a state conversion unit 175. The randomization unit 171 is configured to randomize (hereinafter referred to as random-encode) data received through the host interface 150. The randomization unit 171 is configured to restore (hereinafter referred to as random-decode) data, received through the memory interface 160, to the original data. The randomization unit 171 is configured to state-convert (hereinafter referred to as state-encode) data received through the host interface 150. The randomization unit 171 is configured to restore (hereinafter referred to as state-decode) data, received through the memory interface 160, to the original data.

For example, the encoding/decoding unit 170 may be implemented in a digital circuit, an analog circuit, or a combination thereof. As another example, the encoding/decoding unit 170 may be implemented in software driven in the processor 120. As another example, the encoding/decoding unit 170 may be implemented in a combination of hardware and software.

Figure 4:
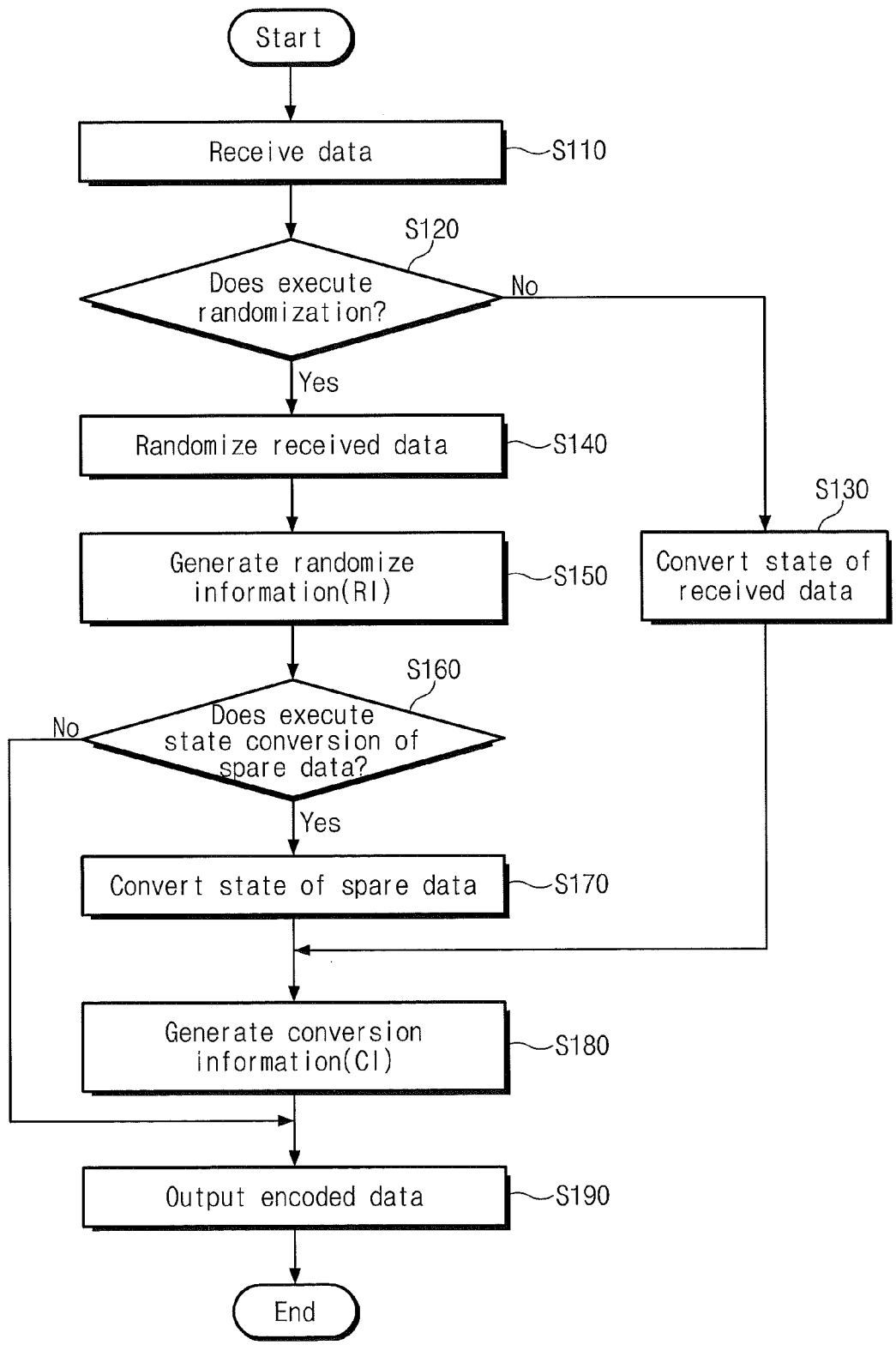
FIG. 4 is a flow chart illustrating operations of the controller of FIG. 3 according to some embodiments.

FIG. 4 is a flow chart illustrating an operation of the controller 100 of FIG. 3 according to some embodiments.

Referring to FIGS. 3 and 4, data are received in step S110. For example, data are received through the host interface 150 from the host. As another example, data are received through the memory interface 160 from the flash memory device 200. For example, the received data are temporarily stored in the RAM 130.

In step S120, it is determined whether to perform a randomization operation. For example, it is assumed that data are received from the host. On the basis of the received data, the processor 120 determines whether to random-encode or state-encode the received data. For example, if the received data are sequential data, the processor 120 determines that a random-encode operation is to be performed. The sequential data means data of a size equal to or larger than the unit of a write operation of the flash memory device 200.

The unit of a write operation of the flash memory device 200 is a page. That is, if the size of the received data is equal to or larger than the storage capacity of one page of the flash memory device 200, the processor 120 determines that a random-encode operation is to be performed. The random-encode operation is performed using a predetermined seed. The random-encode operation improves the reliability of data written in the flash memory device 200.

As another example, if the received data are random write data, the processor 120 determines that a state-encode operation is to be performed. The random write data means data of a size smaller than the unit of a write operation of the flash memory device 200. The unit of a write operation of the flash memory device 200 is a page. If the size of the received data is smaller than the storage capacity of one page of the flash memory device 200, the processor 120 determines that a state-encode operation is to be performed. The state-encode operation includes an operation of exchanging the logic states of the received data. The state-encode operation improves the reliability of data written in the flash memory device 200.

As another example, if data are received from the flash memory device 200, the encoding/decoding unit 170 performs a random-decode operation or a state-decode operation. If the received data are sequential data, the randomization unit 171 performs a random-decode operation. If the received data are random data, the state conversion unit 175 performs a state-decode operation.

The random-encode/decode operation will be described later in detail with reference to FIG. 5. The state-encode/decode operation will be described later in detail with reference to FIGS. 7 to 10.

If it is determined in step S120 that a randomization operation is not to be performed, the controller 100 proceeds to step S130. In step S130, the state of the received data is converted. For example, the state conversion unit 175 of the encoding/decoding unit 170 state-encodes the received data. Thereafter, conversion information CI is generated in step S180. The conversion information CI indicates how the logic states of the received data have been exchanged. The conversion information CI may be generated by the state conversion unit 175.

Thereafter, in step S190, the state-converted data and the conversion information CI are outputted as encoded data. For example, the state-converted data and the conversion information CI are outputted through the memory interface 160 to the flash memory device 200. That is, the state-converted data and the conversion information CI are written in the flash memory device 200.

If it is determined in step S120 that a randomization operation is to be performed, the controller 100 proceeds to step S140. In step S140, the received data are random-encoded. For example, the randomization unit 171 of the encoding/decoding unit 170 random-encodes the received data. In step S150, randomization information RI is generated. The randomization information RI indicates how the received data have been randomized. For example, the randomization information RI includes a seed used in the randomization operation. For example, the randomization information RI is generated by the randomization unit 171.

In step S160, it is determined whether to state-convert spare data. For example, the spare data include data necessary to write/read user data in/from the flash memory device 200. For example, the spare data include a seed used in the randomization operation.

The seed is data necessary to perform a random-encode/decode operation. That is, in a random-encode operation, it is assumed that both of the user data and the spare data are random-encoded and the results are stored in the flash memory device 200. In a read operation, the random-encoded user data and spare data are read from the flash memory device 200. A seed is necessary to perform a random-decode operation. The seed is included in the random-encoded spare data. Thus, if the seed is random-encoded, a random-decode operation is impossible to perform.

If the spare data including a seed are not random-encoded, the spare data have a lower reliability than the random-encoded user data. According to some embodiments, the controller 100 performs a state-conversion operation on the spare data to improve the reliability of the spare data.

If it is determined in step S160 that the spare data are to be state-converted, the controller 100 proceeds to step S170; and if not, the controller 100 proceeds to step S190. Whether to state-convert the spare data may be determined considering the reliability, degradation and program/read time of the flash memory device 200. For example, if the program/erase count is smaller than a predetermined value, the spare data may not be state-converted; and if the program/erase count is greater than the predetermined value, the spare data may be state-converted.

In step S170, the spare data are state-encoded. The state conversion unit 175 may state-encode the spare data including a seed. In step S170, the state-encoded data are not limited to being spare data. For example, the state-encoded data include data that are not random-encoded. In step 180, conversion information CI is generated. The conversion information CI may be generated by the state conversion unit 175.

In step S190, the random-encoded data, the randomization information RI, the state-encoded data, and the conversion information CI are outputted as encoded data. For example, the encoded data are outputted through the memory interface 160 to the flash memory device 200. That is, the encoded data are written in the flash memory device 200.

Figure 5:
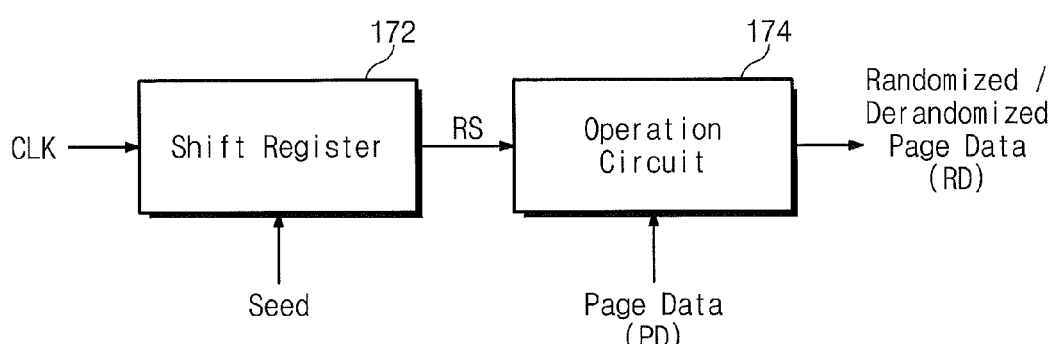
FIG. 5 is a block diagram of a randomization unit of FIG. 3 according to some embodiments.

FIG. 5 is a block diagram of the randomization unit 171 of FIG. 3 according to an embodiment of the inventive concept.

Referring to FIGS. 3 and 5, the randomization unit 171 includes a shift register 172 and an operation circuit 174.

The shift register 172 receives a seed and a clock CLK. The shift register 172 is configured to store the seed. The shift register 172 shifts the stored seed in response to the clock CLK.

For example, it is assumed that the seed is '1011'. When receiving a first clock, the shift register 172 outputs '1' and stores '1101'. When receiving a second clock, the shift register 172 outputs '1' and stores '1110'. When receiving a third clock, the shift register 172 outputs '0' and stores '0111'. When receiving a fourth clock, the shift register 172 outputs '1' and stores '1011'.

That is, if the seed is 4-bit data, the seed cycles in the shift register 172 during the input of the first to fourth clocks. Also, the seed is outputted on a bit-by-bit basis during the cycle of the seed. The output of the shift register 172 is used as a random sequence RS. The random sequence RS is transferred to the operation circuit 174.

For example, the clock CLK provided to the randomization unit 171 may be synchronized with a clock provided to the memory interface 160. For example, the clock CLK provided to the randomization unit 171 may be a system clock of the controller 100. As another example, the clock CLK provided to the randomization unit 171 may be an internal clock generated from the system clock of the controller 100.

The operation circuit 174 receives the random sequence RS from the shift register 172. The operation circuit 174 receives page data PD. For example, the page data PD may be received from the host interface 150. That is, the page data PD may be write data received from the host. As another example, the page data PD may be received from the memory interface 160. That is, the page data PD may be read data received from the flash memory device 200.

The operation circuit 174 may be configured to logically operate the page data PD and the random sequence RS. For example, the operation circuit 174 may be configured to output the XOR (eXclusive OR) value of the page data PD and the random sequence RS. For example, if the page data PD are write data, the output of the operation circuit 174 may be random-encoded page data RD. The random-encoded page data RD may be stored in the flash memory device 200.

For example, the seed may be data retained in the randomization unit 171. For example, the randomization unit 171 may store a plurality of seeds in a table. For example, a specific seed may be selected among the stored seeds on the basis of received data. For example, a specific seed may be selected among the stored seeds on the basis of an address received from the host. For example, a specific seed may be selected among the stored seeds according to the frequency of program/erase operations. As another example, the seed may be randomly-generated data.

As another example, if the page data PD are read data, the page data PD may be random-encoded data. The operation circuit 174 may decode the page data PD to output the original data. For example, if the page data PD are read data, the randomization unit 171 may decode the page data PD by means of the spare data read from the flash memory device 200 together with the page data PD. The randomization unit 171 may detect the seed from the read spare data.

For example, the read spare data may be state-decoded by the state conversion unit 175. The state-decoded spare data may be transferred to the randomization unit 171. The randomization unit 171 may detect the seed from the state-decoded spare data. The detected seed may be provided to the shift register 172. That is, the randomization unit 171 may random-decode the page data PD by means of the seed used in the random encode operation.

For example, the output of the operation circuit 174 may be transferred to the host. As another example, the output of the operation circuit 174 may be updated and random-encoded and the results may be stored in the flash memory device 200. For example, the data read from the flash memory device 200 may be copied back.

A program operation of the flash memory device 200 may be performed by F-N tunneling or hot electron injection. In the program operation of the flash memory device 200, an electric charge may be transferred through a tunnel insulating layer to a charge storage layer. Thus, the tunnel insulating layer may degrade as the program operation repeats. The degradation of the tunnel insulating layer may change the program characteristics of the corresponding memory cell.

The amount of the electric charge transferred to the charge storage layer of the corresponding memory cell may increase with an increase in the threshold voltage level of the programmed memory cell. That is, the degradation degree of the corresponding memory cell may increase with an increase in the threshold voltage level of the programmed memory cell. For example, it is assumed that a first memory cell is repeatedly programmed to a first threshold voltage and a second memory cell is repeatedly programmed to a second threshold voltage higher than the first threshold voltage. Herein, the first and second memory cells may differ in their degradation degrees. For example, the degradation degree of the second memory cell may be greater than the degradation degree of the first memory cell.

That is, if the memory cells are repeatedly programmed in the same data pattern, they may differ in their degradation degrees.

If the memory cells differ in their degradation degrees, they may differ in their program characteristics, thus increasing the probability of a program error or a read error in the memory cells.

The randomization unit 171 logically operates the page data PD to generate randomized data RD. The logical operation is performed using a selected seed. Thus, even when the page data PD of the same pattern are received, the pattern of the random-encoded page data RD may vary according to the selected seed. The randomized data are written in the flash memory device 200. Thus, the data of the same pattern are prevented from being repeatedly written in the flash memory device 200. That is, the flash memory device 200 improves in reliability.

As time passes, a charge loss may occur in the charge storage layer of the memory cell of the flash memory device 200. If the charge loss increases above a predetermined level, a read error may occur in the corresponding memory cell. It is assumed that a first memory cell with a first threshold voltage is adjacent to a second memory cell with a second threshold voltage lower than the first threshold voltage. The strength of the electric field between the first memory cell and the second memory cell may increase with an increase in the difference between the first threshold voltage and the second threshold voltage. The level of a charge loss in the first memory cell may increase with an increase in the strength of the electric field between the first memory cell and the second memory cell. That is, the probability of a read error in the first memory cell may increase with an increase in the threshold voltage difference between the adjacent first and second memory cells.

It will be understood that the seed may be selected to reduce the threshold voltage difference between the adjacent memory cells below a predetermined value. In this case, it will be understood that the random-encoded page data RD may improve in reliability.

As described above, when received data are sequential data, the received data are randomized. Thus, it will be understood that the data written in the flash memory device 200 may improve in reliability.

It has been described in the above embodiments that the spare data of the randomized data are state-converted. However, it will be understood that the state conversion operation of the spare data of the randomized data may be omitted to improve the operation speed of the memory system 10. In this case, the seed may be detected from the spare data without a state-decode operation.

Figure 6:
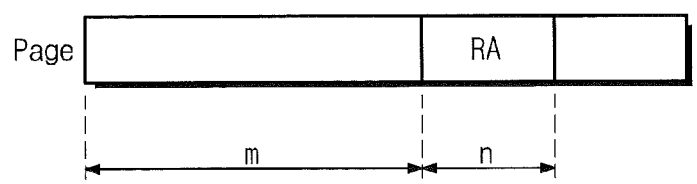
FIG. 6 is a diagram illustrating a storage region of a memory cell array of the flash memory device of FIG. 2 according to some embodiments.

FIG. 6 is a diagram illustrating a storage region of the memory cell array 210 of the flash memory device 200 of FIG. 2 according to some embodiments.

In the example illustrated in FIG. 6, it is assumed that the storage region illustrated in FIG. 6 is a page, and that the address of data in the storage region increases from the left toward the right of the page.

It is further assumed that a program operation is performed on a specific region RA in the page of FIG. 6. That is, it is assumed that a random read/write operation is performed on the specific region RA. It is assumed that the specific region A is comprised of 'n' bits, and address regions before the specific region RA are comprised of 'm' bits.

In a read/write operation, data are encoded/decoded by the randomization unit 171. As described in FIG. 5, a random-encode/decode operation is performed using random sequences RS that are sequentially generated in response to the clock CLK. For example, the random sequences RS may be sequentially generated in response to an address count-up. Thus, (m+n) random sequences RS are necessary to random-encode/decode the specific region RA. Herein, the 'm' random sequences RS may be disregarded and the 'n' random sequences RS may be used to random-encode/decode the specific region RA.

As described above, in a random read/write operation, (m+n) random sequences are necessary to access the specific region RA comprised of 'n' bits. (m+n) clocks CLK are necessary to generate the (m+n) random sequences. Thus, a time delay may occur if a randomization operation is performed in a random write/read operation. In order to overcome the above problem, the memory system 10 of FIG. 1 according to some embodiments performs a state-encode/decode operation in a random read/write operation.

FIGS. 7 to 10 are diagrams illustrating state conversion operations of the controller 100 of FIG. 3 according to some embodiments.

Figure 7:
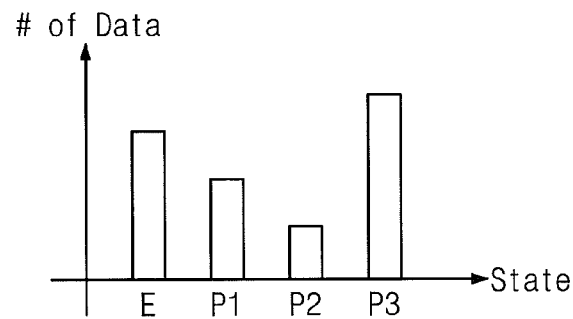
FIGS. 7 to 10 are diagrams illustrating state conversion operations of the controller of FIG. 3 according to some embodiments.

In FIG. 7, the axis of abscissas (x-axis) represents logic states and the axis of ordinates (y-axis) represents the number of data. Each of the logic states is comprised of two bits. When data are programmed in a memory cell, the threshold voltage of the memory cell may be determined according to the logic state represented by the data.

An erase state E and first to third program states P1~P3 are illustrated in FIG. 7. For example, it is assumed that the lowest to highest logic states are represented along the direction of the axis of abscissas (x-axis). For example, it is assumed that the erase state E represents the lowest logic state and the third program state P3 represents the highest logic state.

For example, it is assumed that, when data are programmed in the flash memory device 200, the threshold voltage corresponding to the first program state P1 is higher than the threshold voltage corresponding to the erase state E, the threshold voltage corresponding to the second program state P2 is higher than the threshold voltage corresponding to the first program state P1, and the threshold voltage corresponding to the third program state P3 is higher than the threshold voltage corresponding to the second program state P2.

The logic states illustrated in FIG. 7 represent the logic states of data received from the host. Referring to FIG. 7, the number of states decreases in the order of the third program state P3, the erase state E, the first program state P1 and the second program state P2.

When data corresponding to the states illustrated in FIG. 7 are programmed in the flash memory device 200, the threshold voltage corresponding to the third program state P3 is the highest among the threshold voltages corresponding to the four logic states E and P1~P3. Thus, the memory cells programmed to the third program state P3 may be most strongly influenced by the effect of a charge loss. Also, the memory cells programmed to the third program state P3 may transfer the coupling effects to the adjacent memory cells most strongly.

The threshold voltage corresponding to the erase state E is the lowest among the threshold voltages corresponding to the four logic states E and P1~P3. Thus, in a read operation, the memory cells programmed to the erase state E may be most strongly stressed by a read voltage. That is, the memory cells programmed to the erase state E may be most strongly influenced by the effect of a read voltage disturbance.

The state conversion unit 175 may convert the state of program data so that the amount of data corresponding to the third program state P3 and the erase state E (among program data) becomes smaller than the amount of data corresponding to the first and second program states P1 and P2.

Figure 8:
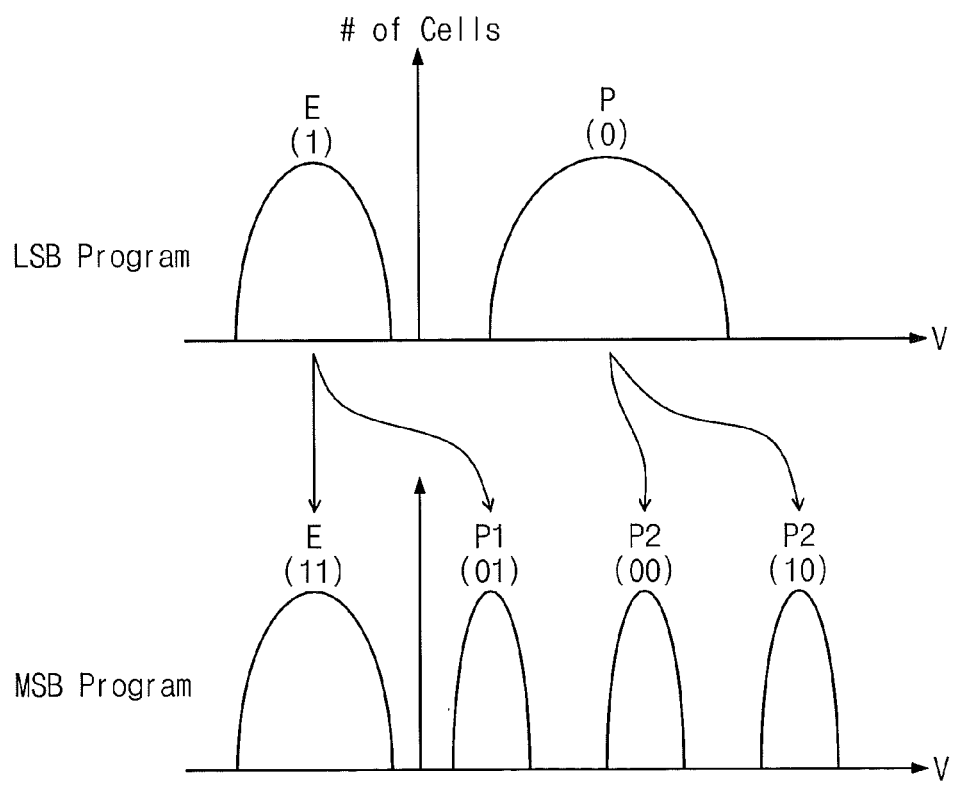

FIG. 8 is a diagram illustrating program operations of the flash memory device 200 according to some embodiments.

In FIG. 8, the axis of abscissas (x-axis) represents voltages and the axis of ordinates (y-axis) represents the number of memory cells. That is, FIG. 8 illustrates the threshold voltage distribution of the memory cells of the flash memory device 200.

A program operation of the flash memory device 200 includes two operation steps. First, when LSB data are received, an LSB program operation is performed. In the LSB program operation, memory cells are programmed to have an erase state E or a program state P. For example, it is illustrated in FIG. 8 that the erase state E represents '1' and the program state P represents '0'.

Thereafter, when MSB data are received, an MSB program operation is performed. In the MSB program operation, memory cells of the erase state E are programmed to an erase state E or a first program state P1. Memory cells of the program state P are programmed to a second program state P2 or a third program state P3. For example, it is illustrated in FIG. 8 that the erase state E represents '11', the first program state P1 represents '01', the second program state P2 represents '00', and the third program state P3 represents '10'.

When LSB data are received from the host, the state conversion unit 175 performs a state-encode operation. For example, the state conversion unit 175 counts the number of 0's and the number of 1's of the received LSB data. The state conversion unit 175 compares the number of 0's and the number of 1's. The state conversion unit 175 performs a state-encode operation according to the comparison result.

For example, the LSB data are state-encoded according the disturbances by the memory cells programmed to the erase state E and the memory cells programmed to the third program state P3.

For example, if the disturbance by the memory cells programmed to the erase state E is smaller than the disturbance by the memory cells programmed to the third program state P3, the state conversion unit 175 performs a state-encode operation so that the number of 1's of the LSB data becomes greater than the number of 0's of the LSB data. That is, if the number of 1's of the LSB data is greater than the number of 0's of the LSB data, the state conversion unit 175 retains the LSB data. If the number of 1's of the LSB data is smaller than the number of 0's of the LSB data, the state conversion unit 175 inverts the LSB data.

As another example, if the disturbance by the memory cells programmed to the erase state E is greater than the disturbance by the memory cells programmed to the third program state P3, the state conversion unit 175 performs a state-encode operation so that the number of 1's of the LSB data becomes smaller than the number of 0's of the LSB data. That is, if the number of 1's of the LSB data is greater than the number of 0's of the LSB data, the state conversion unit 175 inverts the LSB data. If the number of 1's of the LSB data is smaller than the number of 0's of the LSB data, the state conversion unit 175 retains the LSB data.

For example, the state-encode operation for the LSB data is set by the state conversion unit 175. For example, the state-encode operation for the LSB data is set according to a value stored in a mode register (not illustrated) of the state conversion unit 175.

For example, it is assumed that the disturbance by the memory cells programmed to the erase state E is smaller than the disturbance by the memory cells programmed to the third program state P3. That is, the state conversion unit 175 performs a state-encode operation so that the number of 1's of the LSB data becomes greater than the number of 0's of the LSB data.

Figure 9:
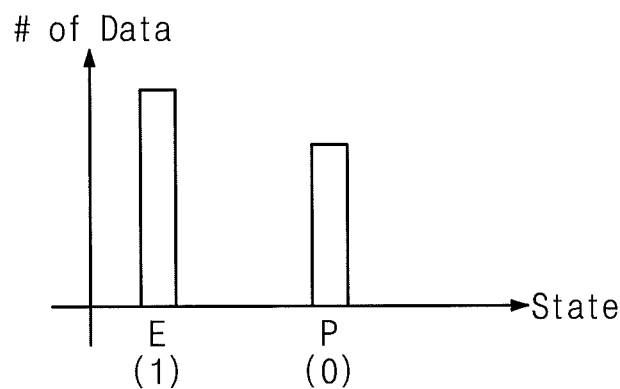

FIG. 9 illustrates state-converted LSB data.

In FIG. 9, the axis of abscissas (x-axis) represents logic states and the axis of ordinates (y-axis) represents the number of data. For example, it is assumed that the lowest to highest logic states are represented along the direction of the axis of abscissas (x-axis). For example, it is assumed that the erase state E represents the lowest logic state and the program state P represents the highest logic state.

When LSB data are received, the state conversion unit 175 converts the LSB data so that the number of 1's of the LSB data becomes greater than the number of 0's of the LSB data. For example, if the number of 0's of the LSB data is greater than the number of 1's of the LSB data, the state conversion unit 175 inverts the LSB data. As another example, if the number of 1's of the LSB data is greater than the number of 0's of the LSB data, the state conversion unit 175 retains the LSB data. That is, in an LSB program operation, the number of erase states E becomes greater than the number of program states P. Data illustrated in FIG. 9 are programmed in the flash memory device 200.

When MSB data are received, the state conversion unit 175 state-encodes the MSB data so that the number of memory cells to be programmed to the first program state P1 becomes greater than the number of memory cells to be programmed to the erase state E and the number of memory cells to be programmed to the second program state P2 becomes greater than the number of memory cells to be programmed to the third program state P3.

For example, it is illustrated in FIG. 9 that MSB data of the erase state E are '1', MSB data of the first program state P1 are '0', MSB data of the second program state P2 are '0', and MSB data of the third program state P3 are '1'. That is, the MSB data of the erase state E and the third program state P3 are '1' and the MSB data of the first program state P1 and the second program state P2 are '0'. The state conversion unit 175 state-encodes the MSB data so that the number of 0's of the MSB data becomes greater than the number of 1's of the MSB data.

For example, if the number of 0's of the MSB data is greater than the number of 1's of the MSB data, the state conversion unit 171 retains the MSB data. If the number of 0's of the MSB data is smaller than the number of 1's of the MSB data, the state conversion unit 171 inverts the MSB data.

Figure 10:
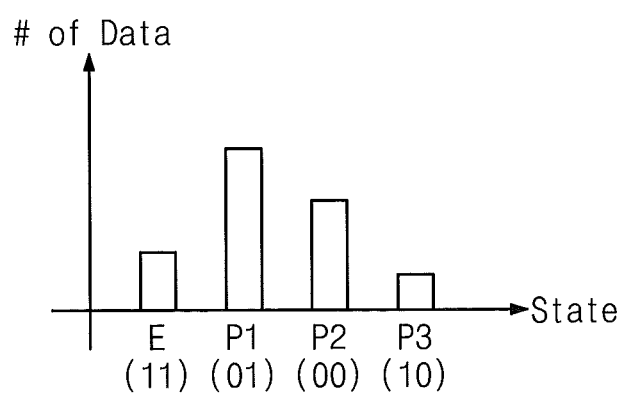

FIG. 10 illustrates state-converted MSB data.

In FIG. 10, the axis of abscissas (x-axis) represents logic states and the axis of ordinates (y-axis) represents the number of data. For example, it is assumed that the lowest to highest logic states are represented along the direction of the axis of abscissas (x-axis). For example, it is assumed that the erase state E represents the lowest logic state and the third program state P3 represents the highest logic state.

When MSB data are received, the state conversion unit 175 converts the MSB data so that the number of 0's of the MSB data becomes greater than the number of 1's of the MSB data. For example, if the number of 1's of the MSB data is greater than the number of 0's of the MSB data, the state conversion unit 175 inverts the MSB data.

Memory cells are programmed from "1' of the LSB to '11' or '01'. When an MSB program operation is performed, the number of 01's is greater than the number of 11's. That is, when a state conversion operation is performed, the number of first program states P1 is always greater than the number of erase states E, thus reducing the disturbance by the memory cells programmed to the erase state E.

Memory cells are programmed from "0' of the LSB to '00' or '10'. When an MSB program operation is performed, the number of 00's is greater than the number of 10's. That is, when a state conversion operation is performed, the number of third program states P3 is always greater than the number of second program states P2, thus reducing the disturbance by the memory cells programmed to the third program state P3.

Relations between the logic states E, P1, P2 and P3 and logic values '11', '01', '00' and '10' described referring to FIGS. 7 to 10 are just an embodiment. It will be understood that the relations between the logic states E, P1, P2 and P3 and logic values '11', '01', '00' and '10' can be applied and optimized in various forms. When the relations between the logic states and the logic values changes, the state conversion operation also changes.

For example, the state conversion operation may be changed that the state conversion unit 175 converts the LSB data so that the number of 1's of the LSB data becomes greater than the number of 0's of the LSB data when LSB data are received, and the state conversion unit 175 converts the MSB data so that the number of 0's of the MSB data becomes greater than the number of 1's of the MSB data when the MSB data are received.

For example, the state conversion operation may be changed that the state conversion unit 175 converts the LSB data so that the number of 0's of the LSB data becomes greater than the number of 1's of the LSB data when LSB data are received, and the state conversion unit 175 converts the MSB data so that the number of 1's of the MSB data becomes greater than the number of 0's of the MSB data when the MSB data are received.

For example, the state conversion operation may be changed that the state conversion unit 175 converts the LSB data so that the number of 0's of the LSB data becomes greater than the number of 1's of the LSB data when LSB data are received, and the state conversion unit 175 converts the MSB data so that the number of 0's of the MSB data becomes greater than the number of 1's when the MSB data are received.

When a state-encode operation is performed, the state conversion unit 175 generates conversion information CI. For example, the conversion information CI indicates whether the corresponding LSB data are inverted and whether the corresponding MSB data are inverted. When state-encoded data are read from the flash memory device 200, the conversion information CI is read simultaneously. The state conversion unit 175 uses the conversion information CI to state-decode the read data.

It is assumed that data to be written in the storage region RA (see FIG. 6) of the flash memory device 200 is received in a random write operation. The state conversion unit 175 state-decodes the received data and generates conversion information CI. The state-decoded data are written in the storage region RA, and the conversion information CI is written in a spare region corresponding to the storage region RA.

It is assumed that data are received from the storage region of the flash memory device 200 in a random read operation. At this point, conversion information CI corresponding to the data stored in the storage region RA is simultaneously read from a spare region corresponding to the storage region RA. The state conversion unit 175 uses the conversion information CI to state-decode the received data.

For example, the storage region RA is a sector. The spare region for storing the conversion information CI is provided on a sector-by-sector basis. That is, it will be understood that the memory system 10 may perform a random read/write operation on a sector-by-sector basis. However, it will be understood that the unit of a random read/write operation of the memory system 10 is not limited to being a sector.

Figure 11:
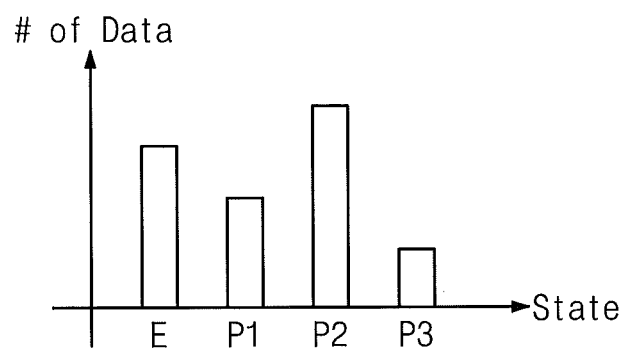
FIGS. 11 to 13 are diagrams illustrating state conversion operations of the controller of FIG. 3 according to further embodiments.
Figure 12:
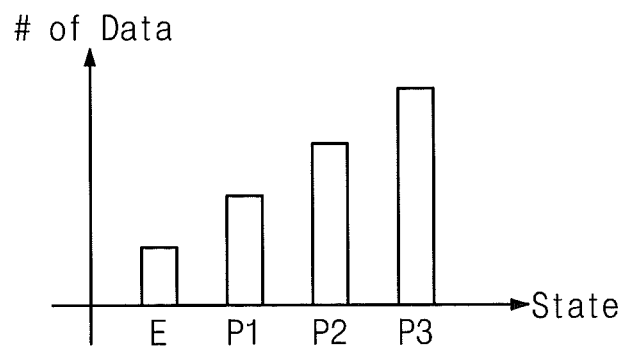
Figure 13:
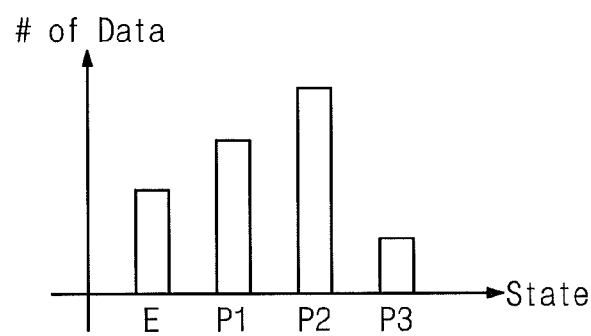

FIGS. 11 to 13 are diagrams illustrating a state conversion operation of the controller 100 of FIG. 3 according to further embodiments.

In FIGS. 11 to 13, the axis of abscissas (x-axis) represents logic states and the axis of ordinates (y-axis) represents the number of data. Each of the logic states is comprised of two bits. When data are programmed in a memory cell, the threshold voltage of the memory cell may be determined according to the logic state represented by the data.

For example, it is assumed that data received from the host have states as illustrated in FIG. 8. The state conversion unit 175 counts the number of the erase states E and the first to third program states P1~P3.

The state conversion unit 175 converts the states represented by data so that the number of the third program states P3 becomes small. For example, the state conversion unit 175 converts the states represented by data so that the number of the third program states P3 becomes smallest among the numbers of the first to third program states P1~P3. It is illustrated in FIG. 7 that the number of the second program states P2 is the smallest among the numbers of the first to third program states P1~P3. The state conversion unit 175 exchanges the second program state P2 and the third program state P3. That is, data representing the third program state P3 are converted to represent the second program state P2. Also, data representing the second program state P2 are converted to represent the third program state P3. The state conversion results are illustrated in FIG. 11.

Referring to FIG. 11, the number of the third program states P3 is reduced in comparison with the states of FIG. 7. Thus, the coupling and charge loss by the memory cells programmed to the third program state P2 may be reduced.

As another example, the state conversion unit 175 converts the states of data so that the number of the erase states E becomes smallest among the numbers of the erase states E and the first and second program states P1 and P2. It is illustrated in FIG. 7 that the number of the second program states P2 is the smallest among the numbers of the erase states E and the first and second program states P1 and P2. The state conversion unit 175 exchanges the first program state P1 and the second program state P2. That is, data representing the erase state E are converted to represent the second program state P2. Also, data representing the second program state P2 are converted to represent the erase state E. The state conversion results are illustrated in FIG. 12.

Referring to FIG. 12, the number of the erase states E is reduced in comparison with the states of FIG. 7. Thus, the read voltage disturbance by the memory cells programmed to the erase state E is reduced.

As another example, the state conversion unit 175 converts the states of received data so that the number of the erase states E and the third program states P3 becomes smaller than the number of the first and second program states P1 and P2. For example, the state conversion unit 175 converts the states of data so that the number of the third program states P3 becomes smallest and the number of the erase states E becomes second-smallest. For example, the state conversion unit 175 exchanges the second program state P2 and the third program state P3 and exchanges the erase state E and the first program state P1.

That is, data representing the third program state P3 are converted to represent the second program state P2, and data representing the second program state P2 are converted to represent the third program state P3. Also, data representing the erase state E are converted to represent the first program state P1, and data representing the first program state P1 are converted to represent the erase state E. The state conversion results are illustrated in FIG. 13.

Referring to FIG. 13, the number of the third program states P3 and the number of the erase states E are reduced in comparison with the states of FIG. 7. Thus, the disturbances by the memory cells programmed to the third program state P3 and the erase state E are reduced.

It will be understood that the state conversion operation may be performed in consideration of the effects of coupling, charge loss and read voltage disturbance so that the number of the erase state E is smallest and the number of the third program state P3 is second-smallest. Also, it will be understood that the first and second program states P1 and P2 may also be converted in consideration of the effects of coupling, charge loss and read voltage disturbance.

In another example, the state conversion unit 175 converts the states of data so that the number of the erase states E becomes smallest and the number of the third program states P3 becomes second-smallest.

The state conversion unit 175 may generate conversion information CI on the basis of the state-encode results. The conversion information CI may include information about the state-encode operation. In a read operation, read data and conversion information CI may be read from the flash memory device 200. The state conversion unit 175 may use the read conversion information CI to state-decode the read data.

As described above, the sequential data are randomized and the random write data are state-converted. Thus, the reliability of data stored in the flash memory device 200 may be improved.

As described above, the sequential data are randomized and the spare data of the sequential data are state-converted. Thus, the reliability of not only the user data but also the spare data may be improved.

It has been described in the above embodiments that a state conversion operation is performed in a random read/write operation. However, it will be understood that a state conversion operation may also be performed in a sequential read/write operation.

Figure 14:
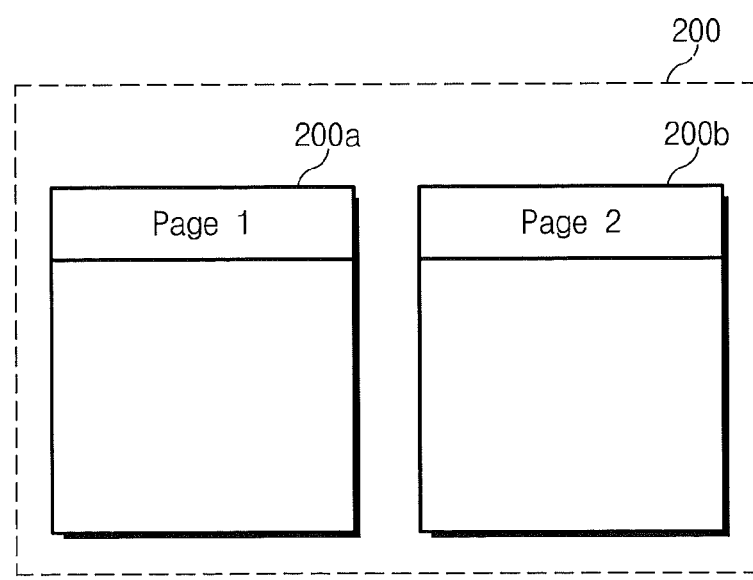
FIG. 14 is a block diagram of the flash memory device of FIG. 2 according to further embodiments.

FIG. 14 is a block diagram of the flash memory device 200 of FIG. 2 according to another embodiment of the inventive concept.

Referring to FIG. 14, the flash memory device 200 includes first and second planes 200a and 200b. The first and second planes 200a and 200b may be read/written independently. In FIG. 14, read/write circuits, address decoders, data input/output circuits and control logic circuits corresponding to the first and second planes 200a and 200b are omitted for conciseness.

A first page Page1 is illustrated in the first plane 200a, and a second page Page2 is illustrated in the second page 200b. For example, it is assumed that the flash memory device 200 supports a multi-plane program function. The multi-plane program function is a function of programming a plurality of planes simultaneously.

For example, the first page Page1 and the second page Page2 are simultaneously programmed in a multi-plane program operation of the flash memory device 200. For example, data to be programmed in the first page Page1 are loaded into the flash memory device 200 and data to be programmed in the second page Page2 are loaded in the flash memory device 200. Thereafter, the first and second pages Page1 and Page2 are programmed simultaneously. Thus, the program time of the first and second pages Page1 and Page 2 is reduced.

For example, it is assumed that the first and second pages Page1 and Page2 are physical pages. That is, the first page Page1 includes a lowest page and a highest page. Also, the second page Page2 includes a lowest page and a highest page.

Figure 15:
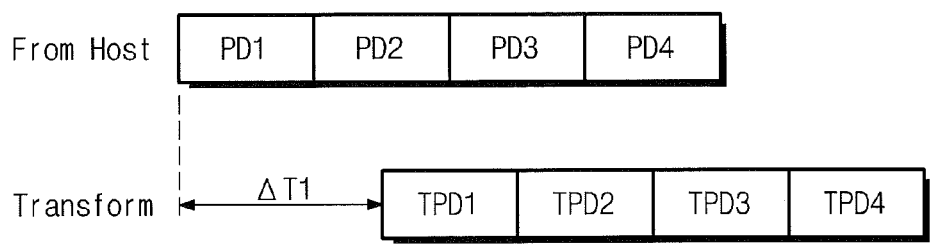
FIG. 15 is a diagram illustrating loading data into a flash memory device in a multi-plain program and state conversion operations according to some embodiments.

FIG. 15 is a diagram illustrating an embodiment of loading data into the flash memory device 200 in a multi-plain program and state conversion operation.

Referring to FIGS. 14 and 15, first page data PD1 are data to be written in the lowest page of the first page Page1. Second page data PD2 are data to be written in the lowest page of the second page Page2. Third page data PD3 are data to be written in the highest page of the first page Page1. Fourth page data PD4 are data to be written in the highest page of the second page Page2. It is assumed that data are received in the order of from the first page data PD1 to the fourth page data PD4.

As described with reference to FIGS. 11 and 13, four logic states are necessary to perform a state conversion operation. That is, both of the lowest page data and the highest page data may be used to program one physical page.

The controller 200 allocates the first page data PD1 as the lowest page data of the first page Page1 and allocates the second page data PD2 as the highest page data of the first page Page1. Also, the controller 200 allocates the third page data PD3 as the lowest page data of the second page Page2 and allocates the fourth page data PD4 as the highest page data of the second page Page2.

The first bit of the first page data PD1 and the first bit of the second page data PD2 represent a logic state to be written in the first memory cell of the first page Page1. Likewise, the $k^{th}$ bit of the first page data PD1 and the $k^{th}$ bit of the second page data PD2 represent a logic state to be written in the $k^{th}$ memory cell of the first page Page1. Thus, when the second page data PD2 start to be inputted, a state conversion operation for the first page Page1 (e.g., an operation of counting the number of logic states) may start to be performed.

The first and second page data PD1 and PD2 are state-encoded to form first and second transformed page data TPD1 and TPD2. The first transformed page data TPD1 are transmitted to the flash memory device 200 to be written in the lowest page of the first page Page1. The second transformed page data TPD2 are transmitted to the flash memory device 200 to be written in the highest page of the first page Page1.

The third and fourth page data PD3 and PD4 are received and state-converted while the first and second transformed page data TPD1 and TPD2 are transmitted to the flash memory device 200. The third and fourth page data PD3 and PD4 are state-encoded to form third and fourth transformed page data TPD3 and TPD4. Upon completion of the transmission of the first and second transformed page data TPD1 and TPD2, the third/fourth transformed page data TPD3/TPD4 are transmitted to the flash memory device 200 to be written in the lowest/highest page of the second page Page2.

A first time delay ΔT1 may occur until the output of the first transformed page data TPD1 after the input of the first page data PD1. However, as described above, the first and second transformed page data TPD1 and TPD2 may be generated when the second page data PD2 are received. The third and fourth page data PD3 and PD4 are received while the first and second transformed page data TPD1 and TPD2 are outputted. The third and fourth transformed page data TPD3 and TPD4 may be generated when the third and fourth page data PD3 and PD4 are received. Upon completion of the output of the second transformed page data TPD2, the third transformed page data TPD3 may be outputted without delay. That it, the reception of the page data PD1~PD4 and the output of the transformed page data TPD1~TPD4 are performed in a pipeline manner. Thus, except the initial first time delay ΔT1, there is no delay in the state conversion operation.

Figure 16:
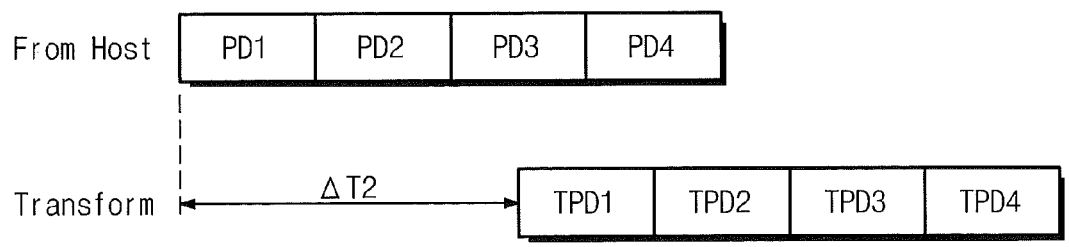
FIG. 16 is a diagram illustrating loading data into the flash memory device in a multi-plain program and state conversion operations according to further embodiments.

FIG. 16 is a diagram illustrating further embodiments of loading data into the flash memory device 200 in a multi-plain program and state conversion operations.

Referring to FIGS. 14 and 16, first page data PD1 are data to be written in the lowest page of the first page Page1. Second page data PD2 are data to be written in the lowest page of the second page Page2. Third page data PD3 are data to be written in the highest page of the first page Page1. Fourth page data PD4 are data to be written in the highest page of the second page Page2. It is assumed that data are received in the order of from the first page data PD1 to the fourth page data PD4.

As described with reference to FIGS. 11 and 13, four logic states are necessary to perform a state conversion operation. That is, both of the lowest page data and the highest page data are necessary to program one physical page.

The controller 200 allocates the first page data PD1 as the lowest page data of the first page Page1 and allocates the second page data PD2 as the lowest page data of the second page Page2. Also, the controller 200 allocates the third page data PD3 as the highest page data of the first page Page1 and allocates the fourth page data PD4 as the highest page data of the second page Page2.

The first bit of the first page data PD1 and the first bit of the third page data PD3 represent a logic state to be written in the first memory cell of the first page Page1. Likewise, the $k^{th}$ bit of the first page data PD1 and the $k^{th}$ bit of the third page data PD3 represent a logic state to be written in the $k^{th}$ memory cell of the first page Page1. Thus, when the third page data PD3 start to be inputted, a state conversion operation for the first page Page1 (e.g., an operation of counting the number of logic states) may start to be performed. Likewise, when the fourth page data PD4 start to be inputted, a state conversion operation for the second page Page2 (e.g., an operation of counting the number of logic states) may start to be performed.

The first and third page data PD1 and PD3 are state-encoded to form first and second transformed page data TPD1 and TPD2. The first transformed page data TPD1 are transmitted to the flash memory device 200 to be written in the lowest page of the first page Page1. The second transformed page data TPD2 are transmitted to the flash memory device 200 to be written in the highest page of the first page Page1.

The fourth page data PD4 are received and the second and fourth page data PD2 and PD4 are state-converted while the first and second transformed page data TPD1 and TPD2 are transmitted to the flash memory device 200. The second and fourth page data PD2 and PD4 are state-encoded to form third and fourth transformed page data TPD3 and TPD4. Upon completion of the transmission of the first and second transformed page data TPD1 and TPD2, the third/fourth transformed page data TPD3/TPD4 are transmitted to the flash memory device 200 to be written in the lowest/highest page of the second page Page2.

A second time delay ΔT2 may occur until the output of the first transformed page data TPD1 after the input of the first page data PD1. However, as described above, the first and second transformed page data TPD1 and TPD2 may be generated when the third page data PD3 are received. The fourth page data PD4 are received while the first and second transformed page data TPD1 and TPD2 are outputted. The third and fourth transformed page data TPD3 and TPD4 may be generated when the fourth page data PD4 are received. Upon completion of the output of the second transformed page data TPD2, the third transformed page data TPD3 may be outputted without delay. That it, the reception of the page data PD1~PD4 and the output of the transformed page data TPD1~TPD4 are performed in a pipeline manner. Thus, except the initial second time delay ΔT2, there may be no significant delay in the state conversion operation.

It will be understood that the loading operation described with reference to FIGS. 15 and 16 may also be applicable in a random-encode operation. For example, when the second page data PD2 start to be received, the first and second page data PD1 and PD2 are random-encoded. For example, the first page data PD1 and the second page data PD2 are provided to the operation circuit 174 of FIG. 5. The first and second page data PD1 and PD2 are random-encoded to form first and second transformed page data TPD1 and TPD2.

As another example, when the third page data PD3 start to be received, the first and third page data PD1 and PD3 are random-encoded. For example, the first page data PD1 and the third page data PD3 are provided to the operation circuit 174 of FIG. 5. The first and third page data PD1 and PD3 are random-encoded to form first and second transformed page data TPD1 and TPD2.

Figure 17:
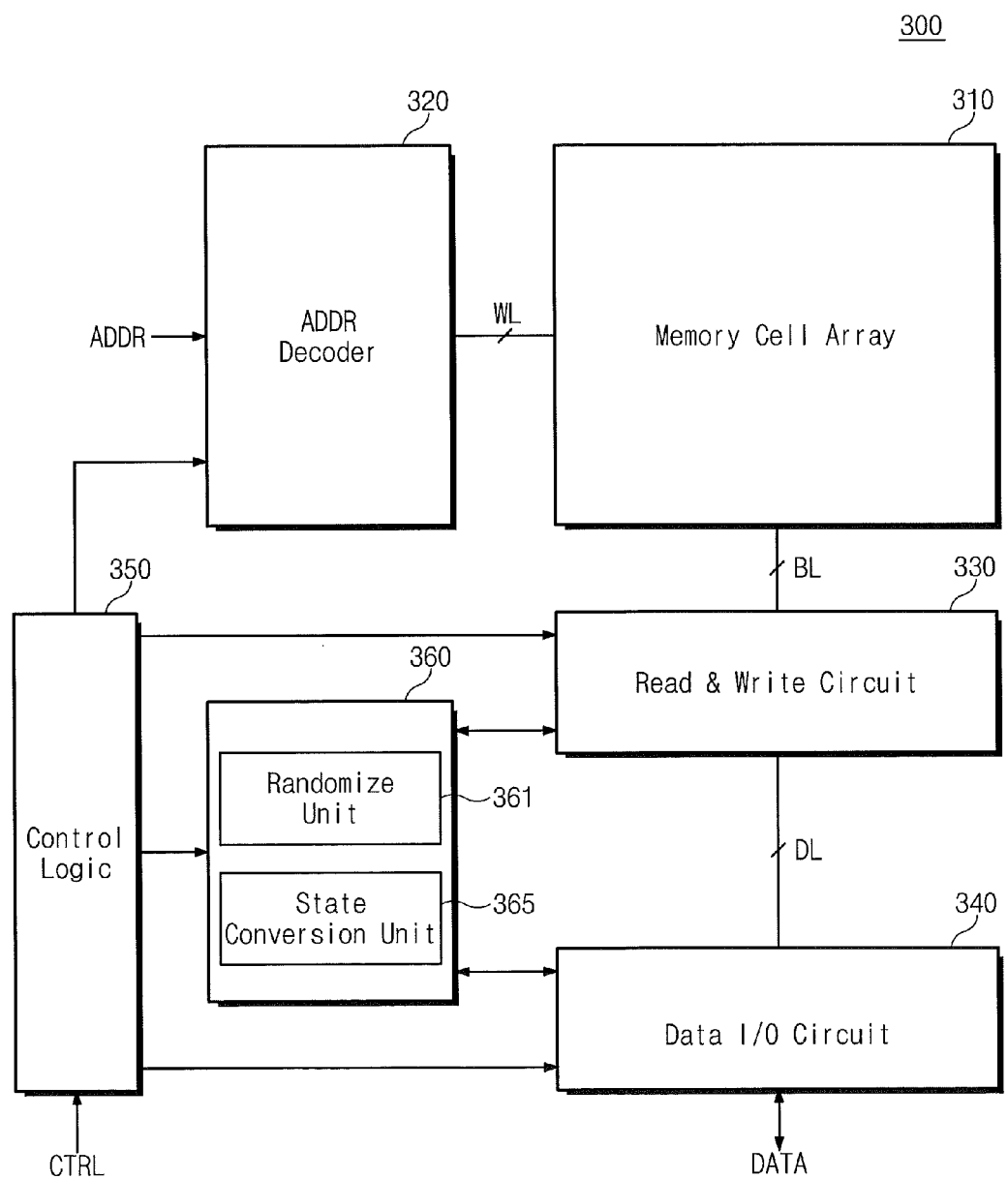
FIG. 17 is a block diagram of the flash memory device of FIG. 1 according to further embodiments.

FIG. 17 is a block diagram of a flash memory device 300 according to further embodiments.

Referring to FIG. 17, a flash memory device 300 includes a memory cell array 310, an address decoder 320, a read/write circuit 330, a data input/output (I/O) circuit 340, a control logic circuit 350, and an encoding/decoding unit 360.

The memory cell array 310, the address decoder 320, the read/write circuit 330, the data I/O circuit 340 and the control logic circuit 350 operate in the same manner as the memory cell array 210, the address decoder 220, the read/write circuit 230, the data I/O circuit 240 and the control logic circuit 250 described with reference to FIG. 2. Thus, a detailed description thereof will be omitted for conciseness.

In comparison with the flash memory device 200 of FIG. 2, the flash memory device 300 of FIG. 17 further includes the encoding/decoding unit 360. That is, an encoding/decoding operation is performed not by the controller 100 but by the flash memory device 300. The encoding/decoding unit 360 includes a randomization unit 361 and a state conversion unit 365. The randomization unit 361 is configured to perform a random-encode/decode operation as described with reference to FIGS. 3 to 5. The state conversion unit 365 operates in a similar manner as described with reference to FIGS. 3, 4 and 6 to 16. Thus, a detailed description thereof will be omitted for conciseness.

Figure 18:
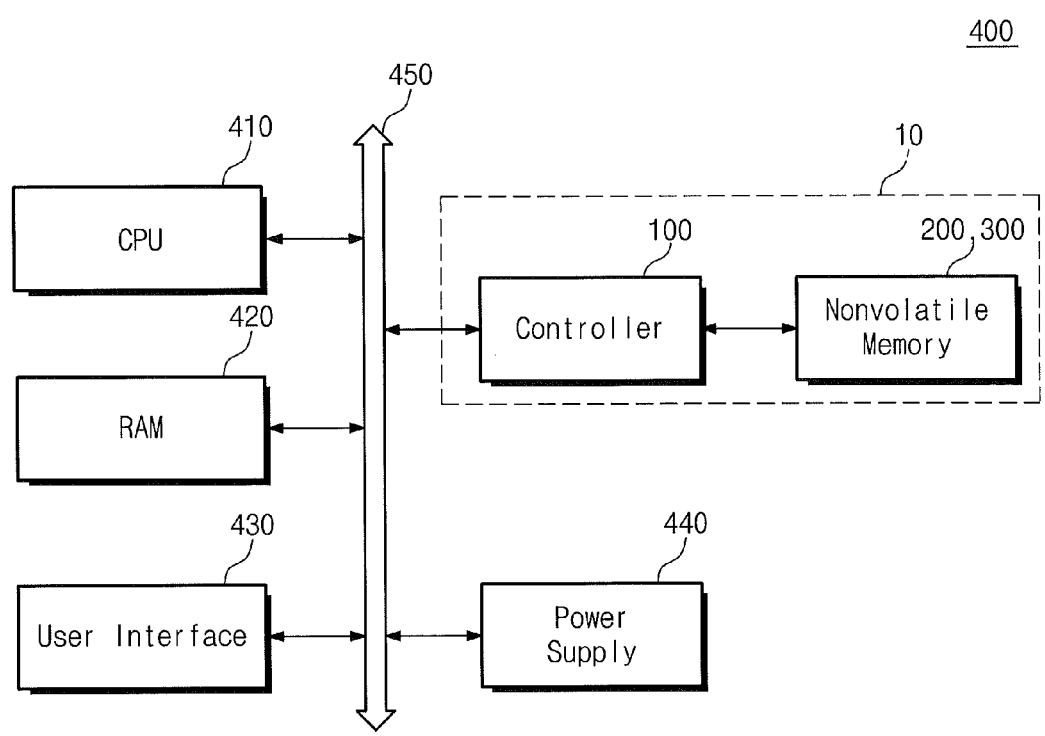
FIG. 18 is a block diagram of a computing system including the memory system of FIG. 1 according to some embodiments.

FIG. 18 is a block diagram of a computing system including the memory system 10 of FIG. 1 according to an embodiment of the inventive concept.

Referring to FIG. 18, a computing system 400 according to an embodiment of the inventive concept includes a central processing unit (CPU) 410, a random access memory (RAM) 420, a user interface 430, a power supply unit 440, and a memory system 10.

The memory system 10 is electrically connected through a system bus 450 to the CPU 410, the RAM 420, the user interface 430, and the power supply unit 440. Data, which are provided through the user interface 430 or processed by the CPU 410, are stored in the memory system 10. The memory system 10 includes a controller 100 and a nonvolatile memory device 200/300 of FIG. 2/17.

When the memory system 10 is used for a solid state disk (SSD), the booting speed of the computing system 400 may increase remarkably. Although not illustrated in FIG. 18, those skilled in the art will readily understand that the computing system 400 may further include an application chipset and a camera image processor.

According to the inventive concept described above, data are randomized or state-converted prior to storage. Thus, the reliability of user devices (or semiconductor memory devices) is improved.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A memory controller comprising:
a first interface unit configured to exchange data with an external device;
a processor configured to determine, in response to data received through the first interface unit, whether to randomize or state-convert the received data in response to a size of the received data;
a randomization unit configured to randomize first data received through the first interface unit to generate randomized first data in response to the processor and to generate randomization information in response to the randomization operation;
a state conversion unit configured to state-convert second data received through the first interface unit to generate state-converted second data in response to the processor and to generate conversion information in response to the state conversion operation; and
a second interface unit configured to receive the randomized first data and the randomization information from the randomization unit, to receive the state-converted second data and the conversion information from the state conversion unit, and to exchange at least one of the randomized first data, the randomization information, the state-converted second data and the conversion information with a memory;
wherein the processor is configured to determine to state-convert the second data in response to the size of the second data being less than a unit of a write operation of the memory and/or in response to the size of the second data being less than a storage capacity of one page of the memory.

2. The memory controller of claim 1, wherein the randomization unit is configured to restore the randomized first data to the original first data using the randomization information received through the second interface unit in response to receiving the randomized first data and the randomization information through the second interface unit.

3. The memory controller of claim 1, wherein the state conversion unit is configured to restore the state-converted second data to the original data using the conversion information received through the second interface unit in response to receiving the state-converted second data and the conversion information through the second interface unit.

4. The memory controller of claim 1, wherein the randomization unit is configured to generate a random sequence in response to a predetermined seed, to perform a logical operation on the random sequence and the received first data, to output the results of the logical operation as the randomized first data, and to output the predetermined seed as the randomization information.

5. The memory controller of claim 1, wherein the state conversion unit is configured to count a number of respective logic states of the received second data, to compare a number of first logic states of the received second data and a number of second logic states of the received second data, and to exchange the first logic states and the second logic states in response to the comparison result.

6. The memory controller of claim 5, wherein the state conversion unit is configured to convert the received second data such that the number of the highest logic states among the received second data becomes smaller than the number of the other respective logic states.

7. The memory controller of claim 5, wherein the state conversion unit is configured to convert the received second data such that the number of the lowest logic states among the received second data becomes smaller than the number of the other respective logic states.

8. The memory controller of claim 1, wherein in response to receiving second data with first and second logic states through the first interface unit, the state conversion unit is configured to count the number of the first logic states and the second logic states of the received second data and to invert the received second data in response to the number of the first logic states being smaller than the number of the second logic states.

9. The memory controller of claim 1, wherein the processor determines to randomize the received data when the received data correspond to sequential data.

10. The memory controller of claim 1, wherein the processor determines to state-convert the received data when the received data correspond to random data.

11. A memory system comprising:
a nonvolatile memory device; and
a memory controller configured to control the nonvolatile memory device, the memory controller comprising:
a first interface unit configured to exchange data with an external device;

a processor configured to determine, in response to data received through the first interface unit, whether to randomize and/or state-convert the received data in response to a size of the received data;

a randomization unit configured to randomize first data received through the first interface unit in response to the processor and to generate randomization information in response to the randomization operation;

a state conversion unit configured to state-convert second data received through the first interface unit in response to the processor and to generate conversion information in response to the state conversion operation; and a second interface unit configured to receive the randomized first data and the randomization information from the randomization unit, receive the state-converted second data and the conversion information from the state conversion unit, and to exchange data with the nonvolatile memory device;

wherein the processor is configured to determine to state-convert the second data in response to the size of the second data being less than a unit of a write operation of the memory device and/or in response to the size of the second data being less than a storage capacity of one page of the memory device.

12. The memory system of claim 11, wherein the nonvolatile memory device and the controller forms a solid state drive (SSD).

13. The memory controller of claim 11, wherein the nonvolatile memory device and the controller forms a memory card.

14. A method for operating a memory controller, comprising:

receiving data from an external device;

determining whether to randomize or state-convert the received data in response to a size of the received data; and randomizing or state-converting the received data in response to the determination results;

wherein determining whether to randomize or state-convert the received data in response to a size of the received data comprises determining whether to state-convert the received data in response to the received data being less than a unit of a write operation of a memory and/or in response to the size of the received data being less than a storage capacity of one page of the memory.

15. The method of claim 14, further comprising:

in response to determining to randomize the received data in response to the size of the received data, randomizing the received data using a seed to generate randomized data;

state-converting the seed to generate a state-converted seed and conversion information; and storing the randomized data, the state-converted seed, and the conversion information in a memory coupled to the memory controller.

* * * * *